(12) United States Patent
Hager et al.

(10) Patent No.: US 6,768,469 B2
(45) Date of Patent: Jul. 27, 2004

(54) METHODS AND APPARATUS FOR RADAR SIGNAL RECEPTION

(75) Inventors: James R. Hager, Golden Valley, MN (US); Larry D. Almsted, Bloomington, MN (US); John H. Keuper, Anoka, MN (US); Larry D. Yaeger, Medina, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/144,872

(22) Filed: May 13, 2002

(65) Prior Publication Data

US 2003/0210195 A1 Nov. 13, 2003

(51) Int. Cl.[7] ............................................... H01Q 13/10
(52) U.S. Cl. ........................................ 343/770; 343/708
(58) Field of Search .......................... 343/770, 700 MS, 343/767, 705, 708; H01Q 13/10

(56) References Cited

U.S. PATENT DOCUMENTS

| | | | |
|---|---|---|---|
| 3,662,392 A | * | 5/1972 | Stapleton et al. ............. 343/708 |
| 3,823,404 A | * | 7/1974 | Buie, Jr. ...................... 343/708 |
| 4,164,036 A | | 8/1979 | Wax |
| 4,197,545 A | | 4/1980 | Favaloro et al. |
| 4,310,894 A | | 1/1982 | Lee et al. |
| 4,328,495 A | | 5/1982 | Thue |
| 4,590,478 A | * | 5/1986 | Powers et al. ........ 343/700 MS |
| 4,675,685 A | * | 6/1987 | Finken ....................... 343/708 |
| 4,684,950 A | | 8/1987 | Long |
| 4,851,852 A | | 7/1989 | Bjorke et al. |
| 4,916,457 A | * | 4/1990 | Foy et al. .................... 343/770 |
| 5,107,268 A | | 4/1992 | Sturm et al. |
| 5,140,331 A | | 8/1992 | Aulenbacher et al. |
| 5,150,125 A | | 9/1992 | Hager |
| 5,173,706 A | | 12/1992 | Urkowitz |
| 5,264,853 A | | 11/1993 | Sturm et al. |
| 5,309,161 A | | 5/1994 | Urkowitz et al. |
| 5,389,931 A | | 2/1995 | Anderson et al. |
| 5,437,091 A | | 8/1995 | Norman |
| 5,446,471 A | * | 8/1995 | Chung et al. ................ 343/770 |
| 5,477,226 A | | 12/1995 | Hager et al. |
| 5,485,157 A | | 1/1996 | Long |
| 5,539,420 A | * | 7/1996 | Dusseux et al. ..... 343/700 MS |
| 5,553,221 A | | 9/1996 | Hyatt |
| 5,589,833 A | | 12/1996 | Randall et al. |
| 5,648,786 A | * | 7/1997 | Chung et al. ................ 343/770 |
| 5,867,119 A | | 2/1999 | Corrubia et al. |
| 5,892,462 A | | 4/1999 | Tran |
| 5,914,693 A | * | 6/1999 | Takei et al. .................. 343/767 |
| 5,945,926 A | | 8/1999 | Ammar et al. |
| 5,969,667 A | | 10/1999 | Farmer et al. |
| 6,011,505 A | | 1/2000 | Poehler et al. |
| 6,025,800 A | | 2/2000 | Hager |
| 6,125,155 A | | 9/2000 | Lesthievent et al. |
| 6,148,195 A | | 11/2000 | Schuchman et al. |
| 6,232,910 B1 | | 5/2001 | Bell et al. |
| 6,260,052 B1 | | 7/2001 | Song |
| 6,297,764 B1 | | 10/2001 | Wormington et al. |
| 6,337,888 B1 | | 1/2002 | Huang et al. |
| 6,362,775 B1 | | 3/2002 | Goebel et al. |
| 6,362,776 B1 | | 3/2002 | Hager et al. |
| 6,507,320 B2 | * | 1/2003 | Von Stein et al. .......... 343/770 |
| 2002/0044098 A1 | | 4/2002 | Von Stein et al. |

* cited by examiner

Primary Examiner—Hoanganh Le
(74) Attorney, Agent, or Firm—Matthew Luxton, Esq.; Armstrong Teasdale LLP

(57) ABSTRACT

An antenna is described which includes first, second, and third conductive layers and a first and second laminate to separate the layers. The laminates are configured with plated through holes to provide contact between the first and third layers, the holes defining antenna cavities, the second conductive layers being the antenna. A plurality of slots in the first conductive layer align within the defined antenna cavities, further defining the antenna cavities for the second conductive layer.

17 Claims, 7 Drawing Sheets

METHODS AND APPARATUS FOR RADAR SIGNAL RECEPTION

BACKGROUND OF THE INVENTION

This invention relates generally to radar systems, and more specifically to a radar system which is capable of synchronization with a digital elevation map (DEM) to accurately determine a location.

The proper navigation of an aircraft in all phases of its flight is based to a large extent upon the ability to determine the terrain and position over which the aircraft is passing. In this regard, instrumentation, such as radar systems, and altimeters in combination with the use of accurate electronic terrain maps, which provide the height of objects on a map, aid in the flight path of the aircraft. Electronic terrain maps are well known and are presently used to assist in the navigation of aircraft.

Pulse radar altimeters demonstrate superior altitude accuracy due to their inherent leading edge return signal tracking capability. The pulse radar altimeter transmits a pulse of radio frequency (RF) energy, and a return echo is received and tracked using a tracking system. The interval of time between signal bursts of a radar system is called the pulse repetition interval (PRI). The frequency of bursts is called the pulse repetition frequency (PRF) and is the reciprocal of PRI.

FIG. 1 shows an aircraft 2 with the Doppler effect illustrated by isodops as a result of selection by the use of Doppler filters. The area between the isodops of the Doppler configuration will be referred to as swaths. The Doppler filter, and resulting isodops are well known in this area of technology and will not be explained in any further detail. Further, the aircraft 2 in the specification will be assumed to have a vertical velocity of zero. As is known, if a vertical velocity exists, the median 8 of the Doppler effect will shift depending on the vertical velocity. If the aircraft 2 has a vertical velocity in a downward direction, the median of the Doppler would shift to the right of the figure. If the aircraft 2 has a vertical velocity in an upward direction, the Doppler would shift to the left of the figure. Again, it will be assumed in the entirety of the specification that the vertical velocity is zero for the ease of description. However, it is known that a vertical velocity almost always exists.

Radar illuminates a ground patch bounded by the antenna beam 10 from an aircraft 2. FIG. 1a shows a top view of the beam 10 along with the Doppler effect and FIG. 1b shows the transmission of the beam 10 from a side view. To scan a particular area, range gates are used to further partition the swath created by the Doppler filter. To scan a certain Doppler swath, many radar range gates operate in parallel. With the range to each partitioned area determined, a record is generated representing the contour of the terrain below the flight path. The electronic maps are used with the contour recording to determine the aircraft's position on the electronic map. This system is extremely complex with all the components involved as well as the number of multiple range gates that are required to cover a terrain area. As a result, the computations required for this system are very extensive.

In addition to the complexity, the precision and accuracy of the distance to a particular ground area or object has never been attained using an airborne radar processor.

BRIEF SUMMARY OF THE INVENTION

In one aspect, an antenna is provided which comprises a first, a second, and a third conductive layer and a first and second laminate to separate the conductive layers. The laminates are configured with a plurality of holes, the holes being plated through with a conductive material providing a conductive path from the first to the third conductive layer. The holes are arranged as to form one or more cavities. A second conductive layer is between the first and second laminates and configured such that a portion of the layer is placed within the cavities, insulated from the first and third conductive layers. The first conductive layer is configured with a plurality of slots aligned with the cavities and the portion of the second conductive layers, forming antenna elements.

In another aspect, an antenna assembly is provided. The assembly comprises a frame which includes a plurality of mounting holes. The frame is further configured with a curvature, the curvature allowing the assembly to fit within an airframe and form a portion of an outer surface of the airframe. The assembly further comprises at least one of the above described antennas, the antennas configured to be mounted within the frame.

DETAILED DESCRIPTION OF THE INVENTION

Figure 1A:
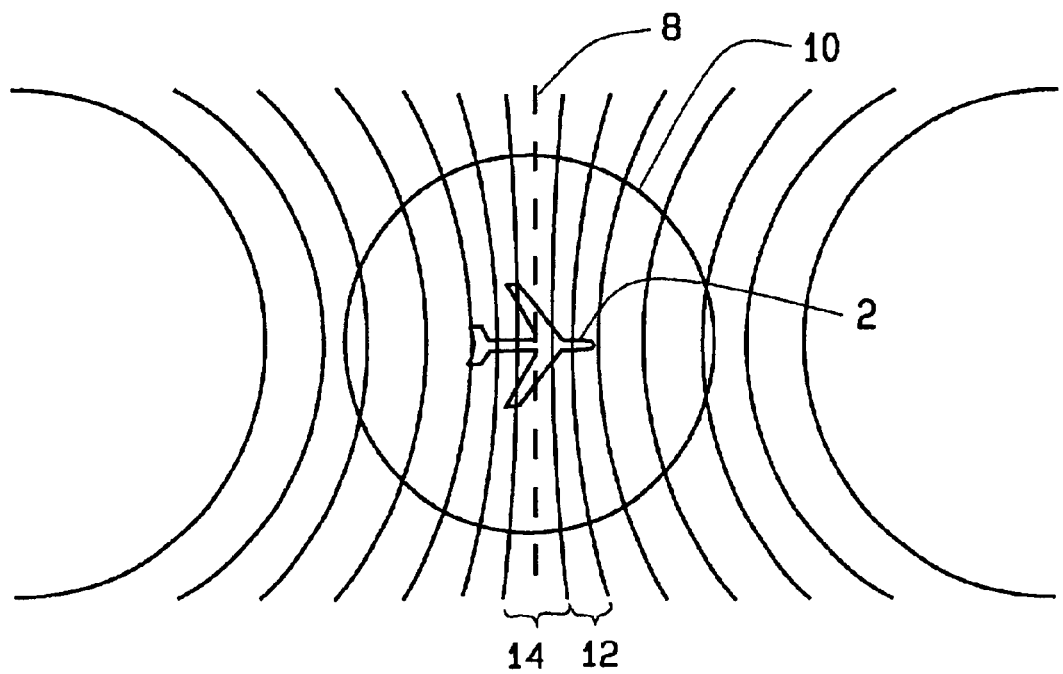
FIG. 1a is a diagram illustrating swaths made by a radar.
Figure 1B:
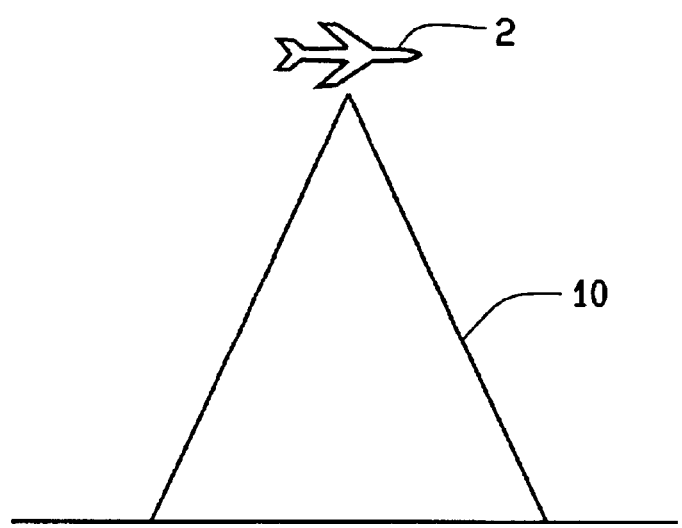
FIG. 1b is a diagram illustrating a radar transmit pattern.

There is herein described a combination Doppler radar/interferometer to navigate an aircraft 2 with respect to terrain features below aircraft 2. As used herein, aircraft is used to identify all flight platforms which may incorporate a radar system, including, but not limited to, jets, airplanes, unmanned aerial vehicles, missiles, and guided weapons. The radar also functions with an electronic map, sometimes referred to herein as a digital elevation map (DEM), in determining a position of aircraft 2. In addition to determining an altitude of aircraft 2, an XYZ location of the nearest object to aircraft 2 on the ground, with respect to aircraft 2 in a certain terrain area can be determined. As aircraft 2 is flying over terrain as shown in FIGS. 1a and 1b, it is important to determine a position of aircraft 2 in accordance with a map. A Doppler filter and range gate are used with a transmitted beam 10 from a transmit antenna.

Figure 2:
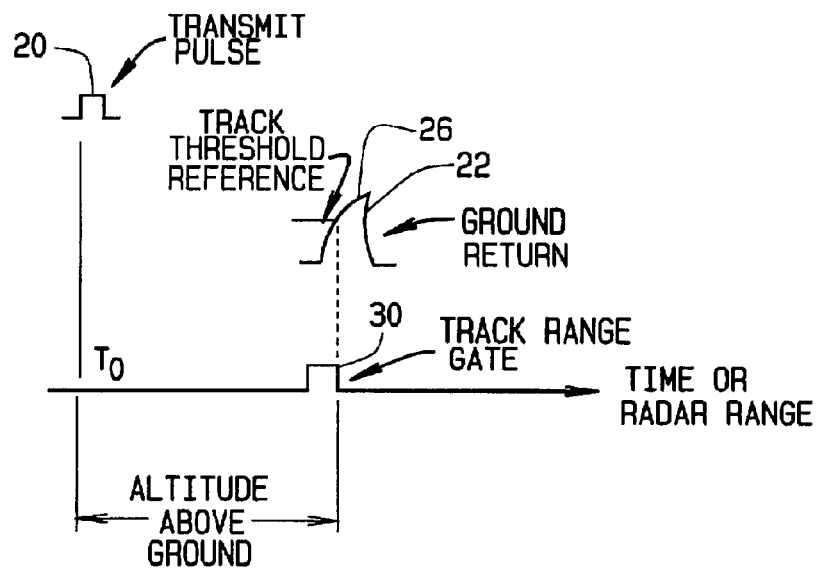
FIG. 2 is an illustration of radar signal waveforms over time.

In a general altitude range tracking radar, range is measured and indicated by measuring the time for transmitted energy to be reflected from the surface and returned. With reference to FIG. 2, a radar transmitter repeatedly sends out bursts of electromagnetic energy at a predetermined repetition rate from an antenna, as indicated by transmit pulse 20. Following a time delay which is a function of the aircraft altitude, a ground return pulse 22 is received by a receiving antenna feeding a receiver. A range gate 30 is utilized by the tracking radar to view at least a portion of ground return 22.

Figure 3:
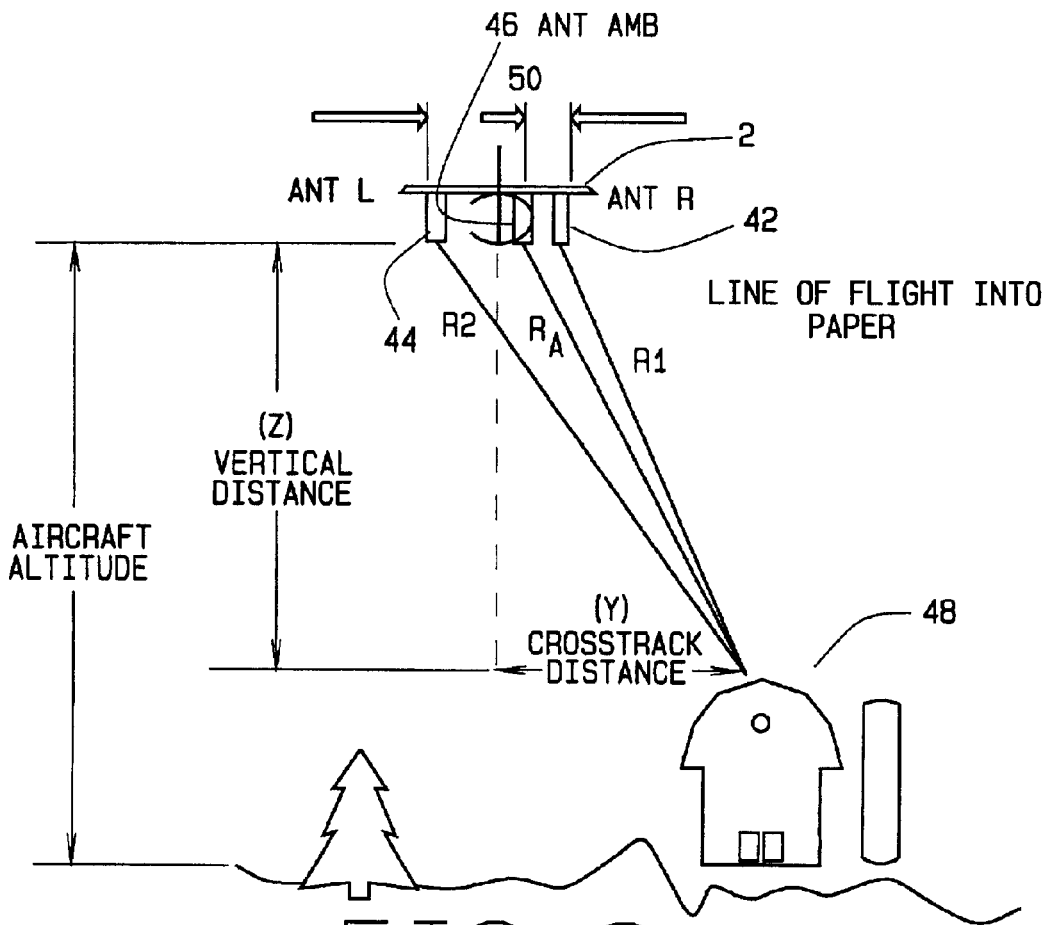
FIG. 3 is a diagram illustrating radar signals being received by three antennas.

Referring to FIG. 3, three receive antennas, antenna R (right) 42, Antenna L (left) 44, and an ambiguous antenna (Ant Amb) 46, are used to receive information. Along with the three antennas, three processing channels, referred to below as left, right and ambiguous respectively, each include a receiver, a data acquisition device, range gate, and a filter. Use of the three antenna system, along with the processing described herein, provides a solution to ambiguous detected angle of the nearest object. The ambiguous detected angle is due to the spacing of the antennas being greater than the transmitted RF frequency wavelength. By receiving three returns, the processing system is able to determine an unambiguous location of the nearest object on the ground, which in turn is utilized to locate position of aircraft 2 in body coordinates. Body coordinates are typically preferable than positioning as determined by known systems, as those systems determine position as if the body aircraft 2 is aligned with the line of flight. As aircraft 2 is prone to pitch, roll, and yaw, the body of aircraft 2 is not necessarily aligned with the line of flight.

In an exemplary illustration, antenna R 42, along with processing systems (described below) will provide a course range search which roughly determines the range to the nearest point 48 in swath 12 (shown in FIG. 1) before aircraft 2 has passed over from swath 14 into swath 12. Determination of the nearest point 48 is performed by a wide bandwidth, high speed track loop which quickly determines the range to nearest point 48 in swath area 12. Nearest point 48 provides a starting point for a tracking loop using antenna L 44 and ambiguous antenna 46. The track loop controls the range gate to track returns from a transmit antenna. A narrow bandwidth, high precision processor is used to set range gates for antenna L 44 and ambiguous antenna 46 to an exact range of nearest point 48 based on the previous course range determination. The operation of the three receive antennas and associated processing channels provides a quick and accurate setting of a range gate on the nearest object in the Doppler swath 14 directly below aircraft 2 so that a phase difference can be measured and along with the known separations 50 amongst the three antennas, a crosstrack distance to the object 48 is determined. The crosstrack distance is the distance, horizontal and perpendicular to the body coordinates of aircraft 2, to object 48.

FIG. 3 shows a view with aircraft 2 going into the Figure. During the phase comparison portion of the time interval, the Doppler filters of the left, right and ambiguous channels are set to select a swath 14 (shown in FIG. 1) below aircraft 2. Further, both range gates are set at a range directly on the nearest object 48 as previously determined. From this range, antenna R 42 receives a signal from object 48 at a distance of R1, ambiguous antenna 46 receives a signal from the object 48 at a distance of RA, and antenna L 44 receives the signal from object 48 at a distance of R2 where the distance difference is a function of the antenna separation 50 between and amongst the three antennas. A phase processor (described below) compares the phase difference between R1 and RA, R2 and RA, and R1 and R2 once the return signals are received. As illustrated in the Figure, the exact range differences (R2-R1), (RA-R1), and (R2-RA) are from phase differences and simple trigonometry relations are used to determine the exact crosstrack distance to the object 48 in aircraft body coordinates.

As illustrated in FIG. 3, after the range differences (R2-R1), (RA-R1), and (R2-RA) are determined and knowing the antenna separations 50, and measured range R1, then the crosstrack distance (Y) and vertical distance (Z) can also be computed in aircraft body coordinates. It is important that the precise location of nearest object 48 in each swath is determined so correlation can be made with the electronic maps which will accurately locate the aircraft 2 on the electronic map. For example, at typical high speed aircraft cruising velocities, a radar, configured with reasonably sized Doppler filters, has swath widths of approximately 10 feet at 5000 feet altitude. The resulting incidence angle formed by the intersection of R1 and a vertical line 27 will then be on the order of less than 3 degrees. Basic trigonometry relations show that even with a typical error (for example 1%) on the radar range gate measured distance R1, (50 feet at 5000 feet altitude), knowing the precise antenna separation 50, and precise range differences (R2-R1), (RA-R1), and (R2-RA), the crosstrack distance (Y) will be precise due to the very small incidence angle encountered.

Figure 4:
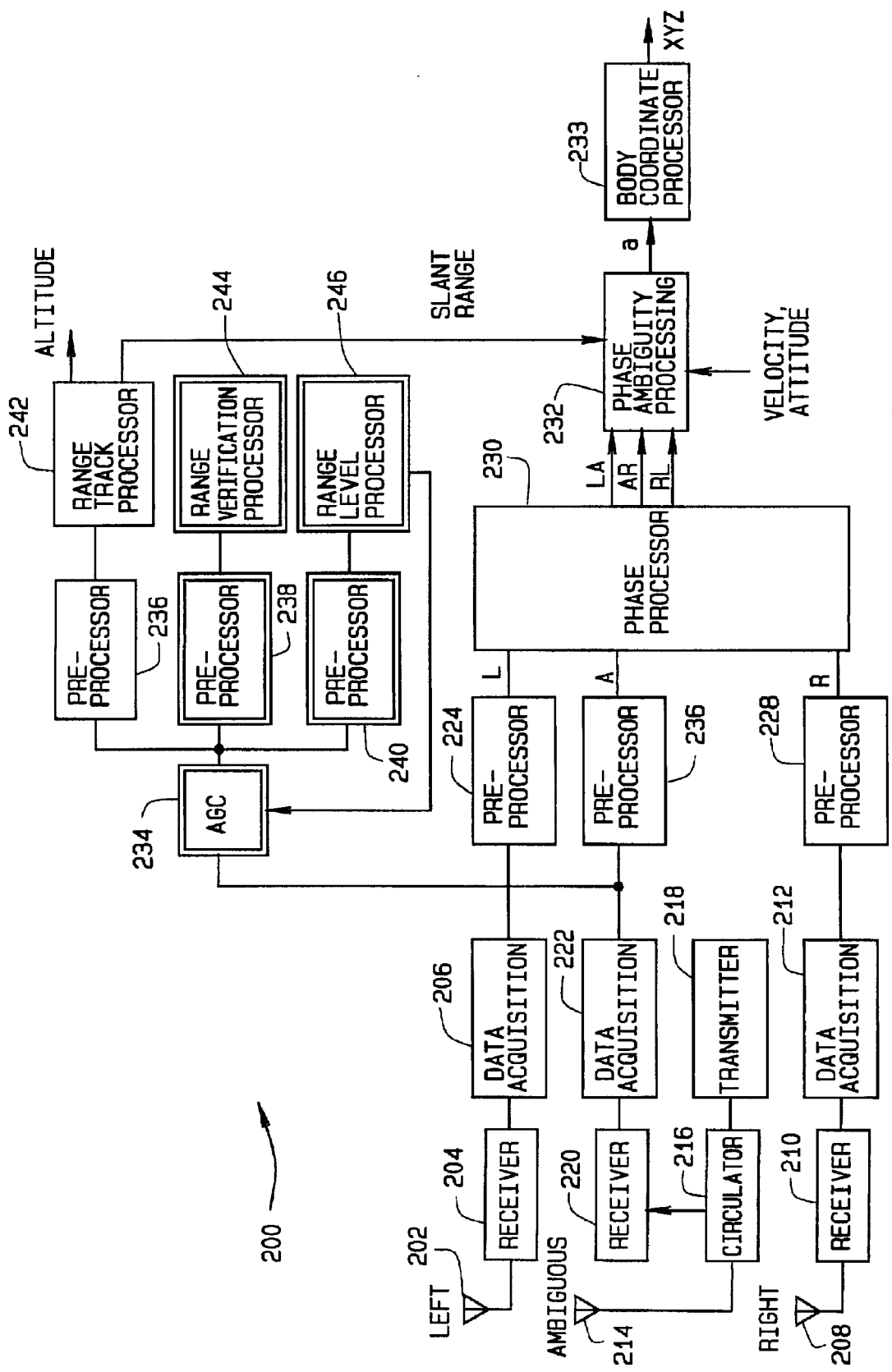
FIG. 4 is a block diagram of a radar signal processing system.

FIG. 4 is one embodiment of a doppler radar processing system 200. System 200 incorporates three radar antennas which receive reflected radar pulses, the pulses having originated from a radar source. A left antenna 202 receives the pulses and forwards the electrical signal to receiver 204. Receiver 204 forwards the received radar signal to a data acquisition unit 206. A right antenna 208 receives the pulses, at a slightly different time than left antenna 202, and forwards the electrical signal to receiver 210. Receiver 210 forwards the received radar signal to a data acquisition unit 212. An ambiguity antenna 214 also receives the reflected radar signal, and passes the received signal to a circulator 216. Circulator 216 functions to direct the transmit signal to the antenna, and to direct the received signal from the antenna to receiver 220, thereby allowing a single antenna to be used for both transmitting and receiving. Receiver 220 forwards the received signal to a data acquisition unit 222.

Data acquisition unit 206 provides a digital signal representative of the signal received at left antenna 202 to a left phase pre-processing unit 224. Similarly, representative signals are received at pre-processing units 226 and 228 from data acquisition units 222 and 212, respectively. Data acquisition units 206, 212, and 222 are configured, in one embodiment, to sample received signals, and thereby reduce the data to a rate which allows a relatively low speed computer to process digitized radar data. In one embodiment, pre-processing units 224, 226, and 228 perform a gate ranging function.

A phase processor 230 receives gated, filtered signals, representative of left, right, and ambiguity signals received at the antennas, and determines a phase relationship between each of the left and ambiguous signal, the right and ambiguous signals, and the right and left signals. The phase relationships between the signals are used, along with slant range, velocity and attitude readings in a phase ambiguity processing unit 232 to determine an interferometric angle to a target. A body coordinate processor 233 utilizes the interferometric angle to determine an XYZ position of, for example, an aircraft employing system 200 with respect to a current aircraft position, sometimes referred to herein as aircraft body coordinates.

A signal from data acquisition unit 222 is also received at an automatic gain control (AGC) unit 234. A signal from AGC unit 234 is passed to pre-processing units 236, 238, and 240. A filtered signal from pre-processing unit 236 is passed to range track processor 242 which provides a slant range signal to phase ambiguity processing unit 232 and altitude information. Pre-processing unit 238 passes a filtered signal to a range verification processor 244. Pre-processing unit 240 passes a filtered signal to a range level processor 246, which also provides a feedback signal to AGC 234.

Figure 5:
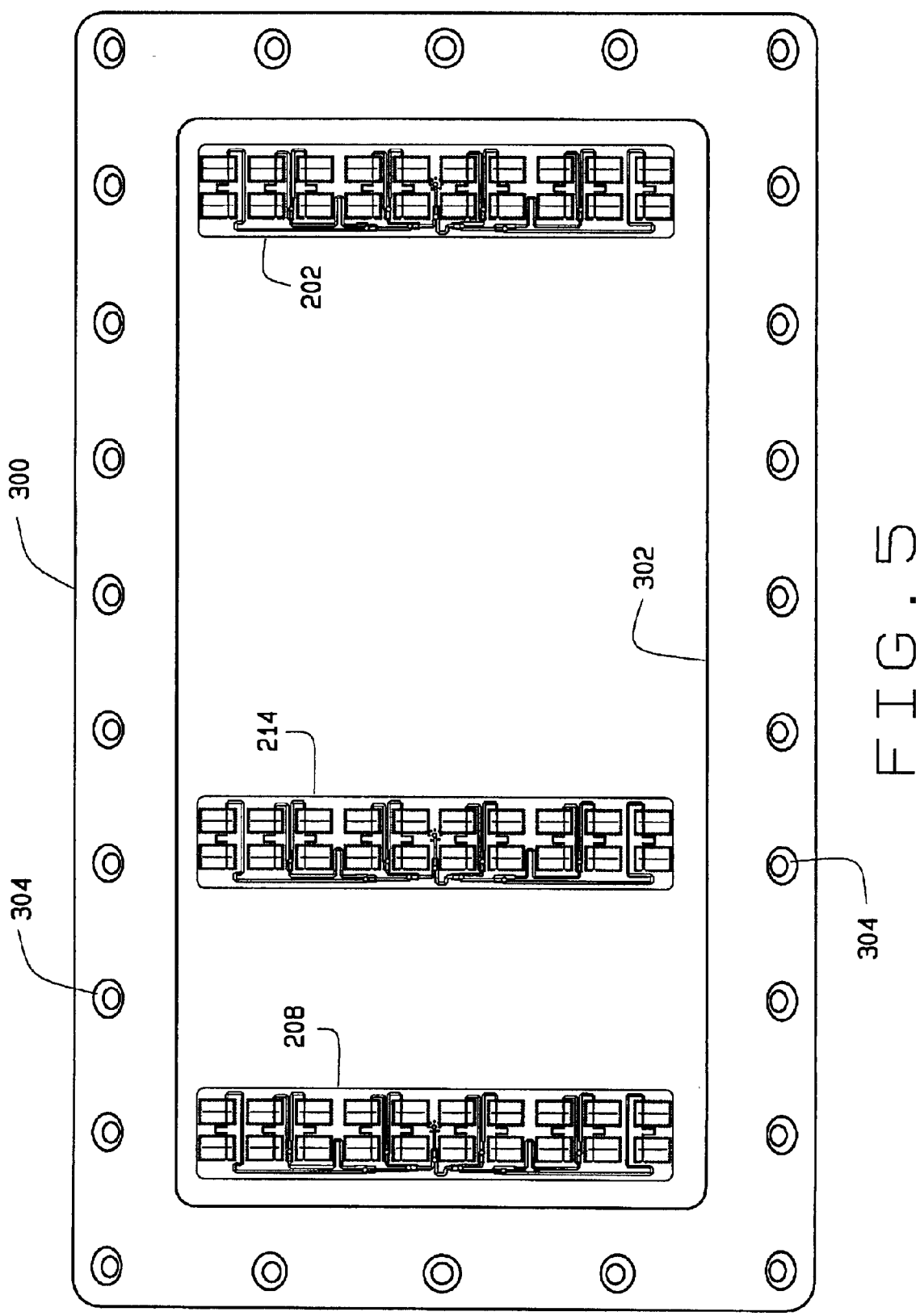
FIG. 5 is a view of an antenna assembly.

FIG. 5 is a view of an antenna assembly 300. Assembly 300, as is further described below, is configured for attachment to a surface of, for example, aircraft 2, Assembly 300 includes a frame 302 for attaching to a surface. Frame 300 is configured with a plurality of mounting holes 304. Assembly 300 further includes antennas 202, 208, and 214 as described above with respect to FIG. 4. Assembly 300 provides multiple large antennas for reception 202, 208, and 214, may be configured additionally as transmit antennas. A distance between antenna 208 and 214, between 208 and 202, and between 202 and 214 allows radar reflections to be received, and phase relationships between the radar returns to be determined in order to solve an ambiguous range to a target, and position of the target with respect to aircraft 2. In one embodiment, assembly is configured with a cover (shown in FIG. 6), such that that antennas 202, 208, and 214 are not visible. Such a cover is made of a material, for example, teflon-fiberglass, as to not affect the signal reception and transmission properties and qualities of antennas 202, 208, and 214. Teflon is a registered trademark of E.I. du Pont de Nemours and Company and identifies polytetrafluoroethylene, or PTFE.

Figure 6:
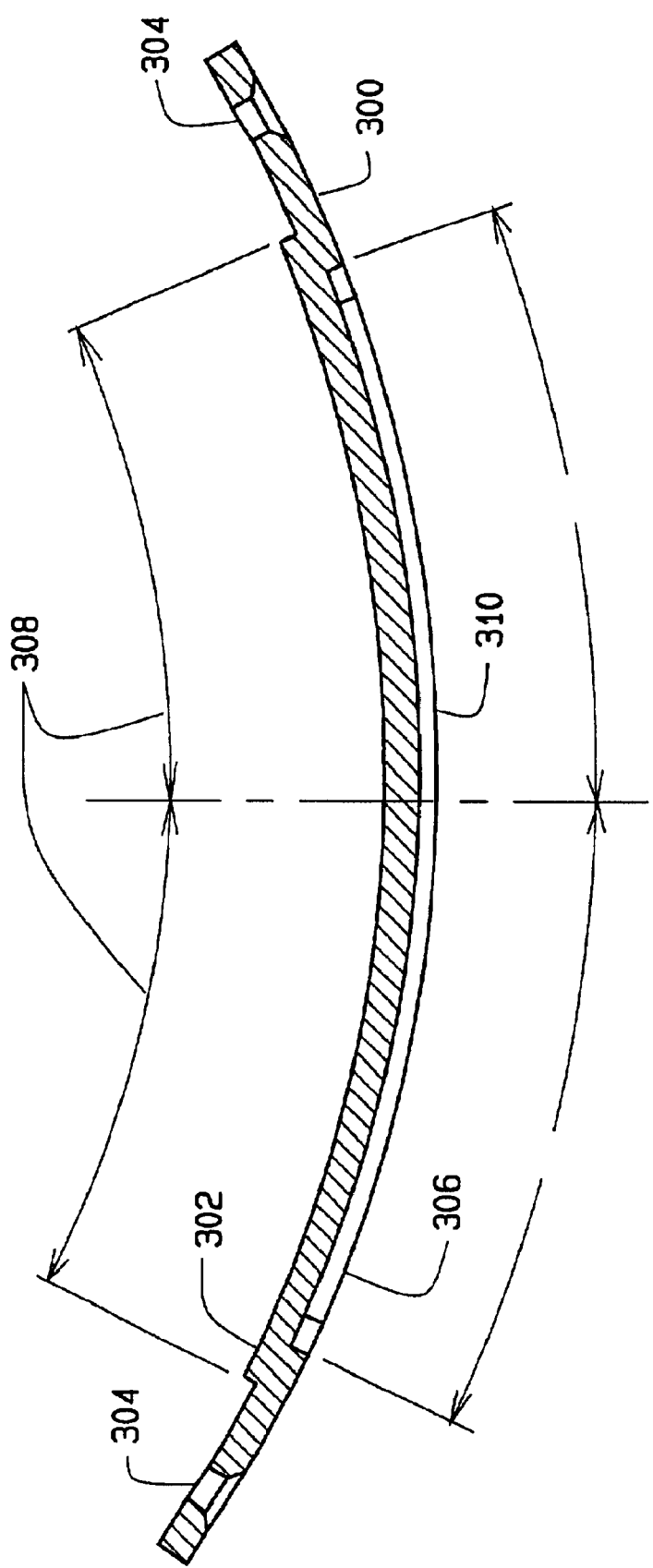
FIG. 6 is a side cut-away view of the antenna assembly of FIG. 5.

FIG. 6 is a side cut-away view of antenna assembly 300. In the embodiment shown assembly 300 includes a cover 306 which fits into frame 302 to provide protection for antennas 202, 208, and 214 (not shown in FIG. 6). With respect to the Figure, it is appreciated that a curvature 308 of assembly 300 allows assembly 300 to be attached to a vehicle, for example, aircraft 2, in such a manner as to allow assembly 300 to form a portion of an outer surface of the vehicle. In such an embodiment, an outer surface 310 of assembly 300 forms a smooth surface with the outer surface of the vehicle, and necessarily fits within a recessed portion of the vehicle. Assembly 300 is mounted to a framework (not shown) of the vehicle utilizing mounting holes 304 (also shown in FIG. 5). Of course it is appreciated that assembly 300 may be formed with multiple curvatures, thereby enabling a smooth surface mounting in vehicles with different curvatures. Assembly 300 provides multiple large radar antennas as described above, while being implemented a relatively thin unit. In one specific embodiment, and as further described below, assembly 300 incorporates antennas 202, 208, and 214, the antennas being 0.120 inches thick, allowing assembly 300 to be relatively thin as above described.

The curvature of assembly 300 dictates that antennas 202, 208 and 214 are not in the same plane, although antennas 202, 208, and 214 are configured for reception of the same radar reflections. It is desirable that antennas 202, 208, and 214 be configured to "look" in a same planar direction. To accomplish such a configuration, antennas 202, 208, and 214 are configured so that they are "squinted" in two axes, in order to get beams of the antennas to point down in the same plane.

Figure 7:
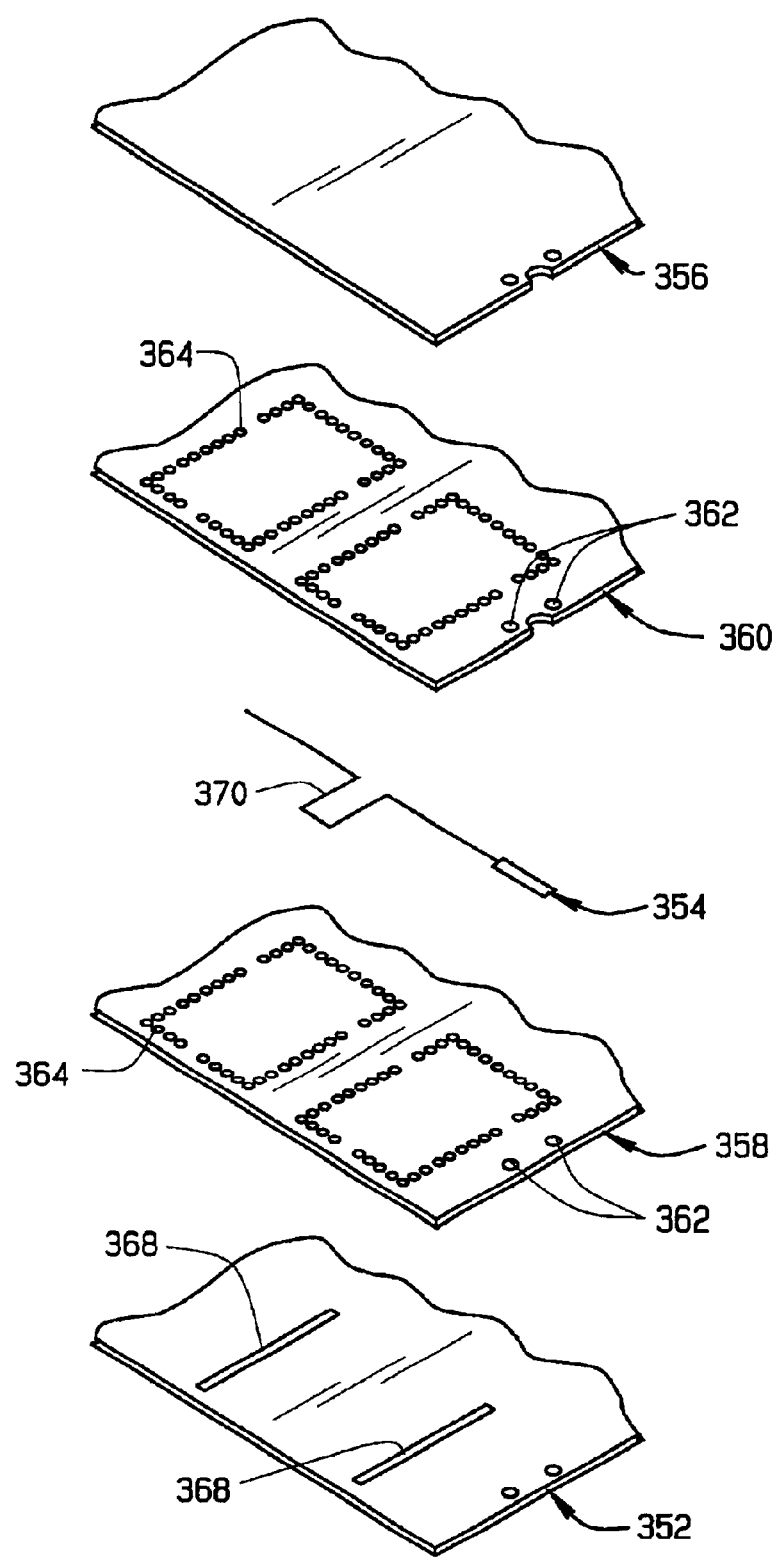
FIG. 7 is a view illustrating discrete layers of an antenna.

FIG. 7 is a view illustrating discrete layers and laminates of an antenna, for example, one of antennas 202, 208, and 214. In the Figure, only a portion of the layers and laminates are shown. Antennas include a first conductive layer 352, a second conductive layer 354, and a third conductive layer 356. Physically separating first layer 352 from second layer 354, is a first laminate 358. Physically separating third layer 356 from second layer 354, is a second laminate 360. That is, first layer 352 is adjacent to a first side of first laminate 358, second layer 354 is adjacent to a second side of first laminate 358 and a first side of laminate 360, and third layer 356 is adjacent to a second side of second laminate 360.

In one embodiment, layers 352, 354, and 356 are made of copper or copper foil. In the embodiment shown, first laminate 358 and second laminate 360 are configured with one or more mounting holes 362, which are not through plated, and are used for assembly. First laminate 358 and second laminate 360 are also configured with a plurality of through holes 364, which are plated through, and provide connectivity between first conductive layer 352 and third conductive layer 356. First laminate 358 and second laminate 360 are, in one embodiment, constructed of a teflon-fiberglass material. In one embodiment, plated through holes 364 define a perimeter of a resonant antenna cavity, while first layer 352 and third layer 356 define a top and bottom, respectively, of the resonant antenna cavity.

First layer 352 is configured with a plurality of slots 368, which, in one embodiment, when first layer 352 is placed adjacent first laminate 358, do not align with any of plated through holes 364. However, plated through holes 364 come into contact with the copper of first laminate 352. Slots 368 further define the antenna cavities, and are sometimes referred to herein as antenna elements 368.

Second layer 354 is configured so as to not contact any of plated through holes 364. Therefore, second layer 354 is configured to drive antenna element 368. Second layer 354 includes one or more lines feeds 370, which provide a way to control phase between cavities of an antenna. Second laminate 360 and third layer 356 provide, respectively, additional strength and grounding for antenna assembly 300.

Figure 8:
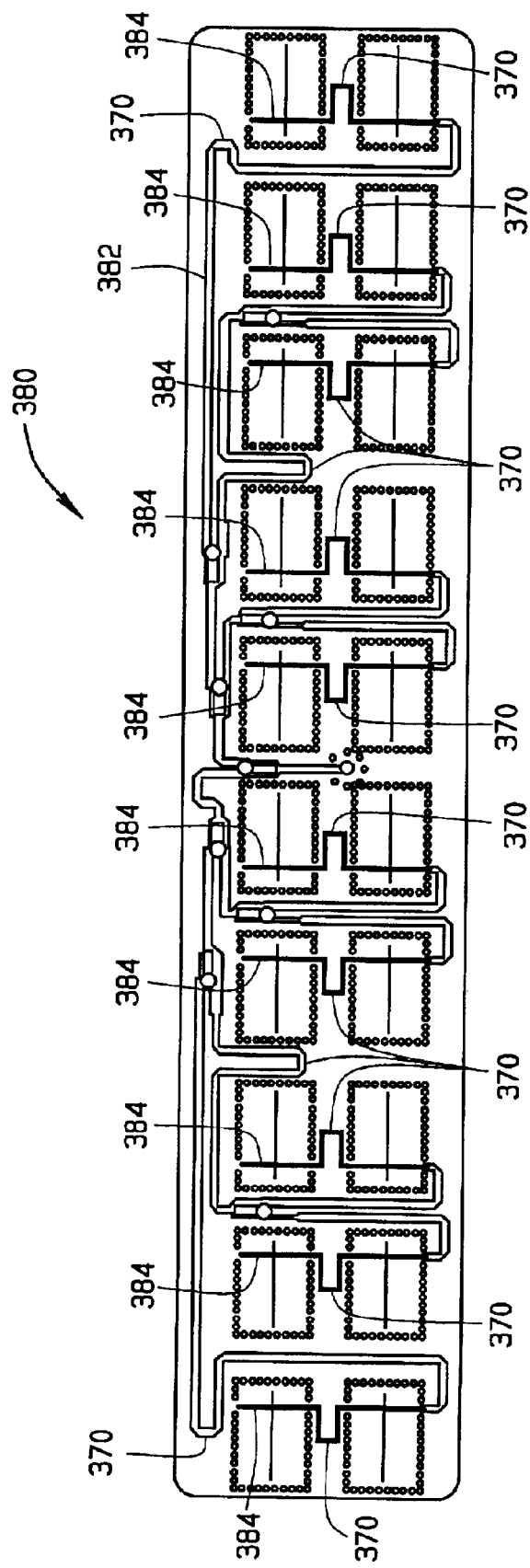
FIG. 8 is a detailed view of an antenna.

FIG. 8 is a detailed view of an antenna 380. FIG. 8 further serves to illustrate one embodiment of an antenna element array 382, which is constructed in the manner described above with respect to second layer 354. In the embodiment shown, element array includes a plurality of antenna elements 368, each including at least one feed line 370, which control phase distortions between adjacent elements 368. Although not shown in the Figure, elements 368 of the first layer 352 (shown in FIG. 7) are situated to align with feed lines 270. The copper of first layer 352 is the slot radiator and also works to shield all of element array 382 except for the feed 370 which is located in antenna cavities. The configuration of element array 382 within antenna assembly 300 enable a large antenna, which allows a high gain, to be constructed within a thin surface area, which is a major consideration when inserting an antenna into an outer surface of a vehicle. When the vehicle is an aircraft, the reduced thickness is critical, as discontinuities in the outer surface, or skin, of the aircraft need to be minimized, to provide a smooth, continuous ground plane with the aircraft. In the antenna above described, first layer 352 (shown in FIG. 7) further provides a continuous extension of the ground plane out onto an aircraft outer surface, and antenna assembly 300 has a total thickness which is equivalent to an aircraft outer surface. Such an antenna assembly further provides a smooth aerodynamic design.

The above described antenna apparatus helps to provide a digital signal processing solution to known radar target position and range ambiguity problems. Use of such an antenna system therefore helps provide a radar system which performs faster and more accurate airborne processing than known radar ambiguity solutions. While the invention has been described in terms of various specific embodiments, those skilled in the art will recognize that the invention can be practiced with modification within the spirit and scope of the claims.

What is claimed is:

1. An antenna comprising:

a first conductive layer, said first conductive layer configured with a plurality of slots formed therein, said first conductive layer electrically connected to an aircraft outer surface, and forming a portion of a continuous ground plane with the aircraft outer surface;

a first laminate comprising a first side and a second side, said first side adjacent said first conductive layer, said first laminate configured with a plurality of holes therethrough, said holes being through plated with a conductive material and configured to contact said first conductive layer;

a second conductive layer, said second conductive layer adjacent to said second side of said first laminate and configured to not contact said holes, at least a portion of said second layer configured to align with said slots in said first conductive layer;

a second laminate comprising a first side and a second side, said first side adjacent said second conductive layer, said second laminate configured with a plurality of holes therethrough, said holes being through plated with a conductive material and configured to align with and contact said holes in said first laminate; and a third conductive layer, said third conductive layer adjacent said second side of said second laminate, said third conductive layer configured to contact said holes of said second laminate, said holes configured to form a perimeter around at least the portion of said second layer which is aligned with said slots in said first conductive layer, thereby forming an antenna cavity.

2. The antenna according to claim 1 configured to provide a plurality of antenna cavities.

3. The antenna according to claim 2 wherein said second conductive layer is configured with a plurality of line feeds, said line feeds configured to control phase relationships between said antenna cavities.

4. The antenna according to claim 1 wherein said first conductive layer, said second conductive layer, and said third conductive layer comprise at least one of copper and copper foil.

5. The antenna according to claim 2 wherein said first conductive layer and said third conductive layer form a top and a bottom for said antenna cavities.

6. The antenna according to claim 1 wherein said slots in said first conductive layer are configured to form antenna elements.

7. An antenna assembly comprising:

a frame which comprises a plurality of mounting holes, said frame configured with a curvature, the curvature allowing said assembly to fit within an airframe and form a portion of an outer surface of the airframe; and at least one antenna configured to be mounted within said frame, said antenna comprising:

a first conductive layer, said first conductive layer configured with a plurality of slots formed therein, said frame allowing for the electrical connection of first conductive layer with an outer surface of an aircraft;

a first laminate comprising a first side and a second side, said first side adjacent said first conductive layer, said first laminate configured with a plurality of holes therethrough, said holes being through plated with a conductive material and configured to contact said first conductive layer;

a second conductive layer, said second conductive layer adjacent to said second side of said first laminate and configured to not contact said holes, at least a portion of said second layer configured to align with said slots in said first conductive layer;

a second laminate comprising a first side and a second side, said first side adjacent said second conductive layer, said second laminate configured with a plurality of holes therethrough, said holes being through plated with a conductive material and configured to align with and contact said holes in said first laminate; and a third conductive layer, said third conductive layer adjacent said second side of said second laminate, said third conductive layer configured to contact said holes of said second laminate, said holes configured to form a perimeter around at least the portion of said second layer which is aligned with said slots in said first conductive layer, thereby forming an antenna cavity.

8. The antenna assembly according to claim 7 comprising three of said antennas, a first antenna configured as a right antenna, a second antenna configured as a left antenna, and a third antenna configured as an ambiguous antenna, said ambiguous antenna configured to be placed between said right antenna and said left antenna, but closer to one of said right antenna and said left antenna.

9. The antenna assembly according to claim 8, said antennas configured such that beams from said antennas point in the same plane, despite a curvature of said assembly.

10. The antenna assembly according to claim 7 wherein said second conductive layer is configured with a plurality of line feeds, said line feeds configured to control phase relationships between the antenna cavities.

11. The antenna assembly according to claim 7 wherein said first conductive layer, said second conductive layer, and said third conductive layer comprise at least one of copper and copper foil.

12. The antenna assembly according to claim 7 wherein said first laminate and said second laminate comprise at least one of polytetrafluoroethylene and fiberglass.

13. The antenna assembly according to claim 7 wherein said slots in said first conductive layer are configured as antenna elements.

14. The antenna assembly according to claim 7 wherein said first conductive layer forms a portion of a continuous ground plane with the outer surface of the aircraft.

15. The antenna assembly according to claim 7 wherein said assembly has a thickness that is equivalent to an outer surface of an aircraft into which said assembly is installed.

16. The antenna assembly according to claim 7 wherein said assembly comprises at least two antennas, said antennas shaped to receive reflections in the same planar direction despite the curvature of said frame.

17. An antenna assembly comprising a conductive layer configured to form a portion of a continuous ground plane with an aircraft outer surface.

* * * * *

UNITED STATES PATENT AND TRADEMARK OFFICE
CERTIFICATE OF CORRECTION

PATENT NO. : 6,768,469 B2
DATED : July 27, 2004
INVENTOR(S) : Hager et al.

It is certified that error appears in the above-identified patent and that said Letters Patent is hereby corrected as shown below:

Column 5,
Line 8, after "reception" insert -- of reflected radar returns. It is to be understood that one or more of antennas --.

Signed and Sealed this

Seventh Day of March, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,768,469 B2 | Page 1 of 1 |
| APPLICATION NO. | : 10/144872 | |
| DATED | : July 27, 2004 | |
| INVENTOR(S) | : Hager et al. | |

It is certified that error appears in the above-identified patent and that said Letters Patent is hereby corrected as shown below:

In the Claims

Claim 17, Column 8, Line 55, delete "17. An antenna assembly comprising a conductive layer configured to form a portion of a continuous ground plane with an aircraft outer surface."

Signed and Sealed this
Seventeenth Day of December, 2013

Margaret A. Focarino
*Commissioner for Patents of the United States Patent and Trademark Office*